United States Patent [19]
Wakamatsu et al.

[11] 3,863,730
[45] Feb. 4, 1975

[54] ANTI-SKID CONTROL DEVICE FOR VEHICLES WITH CLUTCH RELEASING

[75] Inventors: Hisato Wakamatsu; Noriyoshi Ando; Kazu Majima, all of Kariya, Japan

[73] Assignee: Nippon Denso Company Limited, Kariya-shi, Aichi-ken, Japan

[22] Filed: Feb. 26, 1971

[21] Appl. No.: 119,311

Related U.S. Application Data

[63] Continuation-in-part of Ser. No. 61,407, Aug. 5, 1970, abandoned, and a continuation of Ser. Nos. 808,596, March 19, 1969, abandoned, and Ser. No. 829,901, June 3, 1969; Pat. No. 3,653,726.

[30] Foreign Application Priority Data

| Apr. 22, 1968 | Japan | 43-26923 |
| June 3, 1968 | Japan | 43-37904 |
| June 6, 1968 | Japan | 43-38879 |
| Oct. 31, 1968 | Japan | 43-79445 |
| Jan. 11, 1969 | Japan | 44-2177 |

[52] U.S. Cl. ........ 180/82 R, 192/13 R, 303/21 CG, 303/21 BE
[51] Int. Cl. ........................... B60t 8/08
[58] Field of Search ......... 180/82, 105; 303/21 CG, 303/21 BE, 21 P; 192/13 R, 4 A, 18 B, 103 C, .044; 317/5; 340/262

[56] References Cited
UNITED STATES PATENTS

| 1,999,284 | 4/1935 | Colvin | 192/13 R |
| 2,133,659 | 10/1938 | Doriot | 192/13 R |
| 2,760,610 | 8/1956 | Prachar | 192/.044 X |
| 2,974,769 | 3/1961 | Henderson | 192/103 C |
| 2,990,925 | 7/1961 | Bernotas | 192/4 A |
| 3,021,181 | 2/1962 | Fitch | 303/21 CG |
| 3,060,602 | 10/1962 | Buttenhoff | 180/77 R |
| 3,165,180 | 1/1965 | Inderau | 188/181 A X |
| 3,260,555 | 7/1966 | Packer | 317/5 X |
| 3,400,776 | 9/1968 | Smith | 303/21 BE |
| 3,499,689 | 3/1970 | Carp et al. | 303/21 P |
| 3,520,575 | 7/1970 | Steigerwald | 303/21 BE |
| 3,552,803 | 1/1971 | Lucien | 303/21 BE |
| 3,606,490 | 9/1971 | Ando | 340/262 X |
| 3,610,362 | 10/1971 | Toyama et al. | 303/21 BE |
| 3,637,057 | 1/1972 | Okamoto | 192/13 R |

*Primary Examiner*—Kenneth H. Betts
*Attorney, Agent, or Firm*—Cushman, Darby & Cushman

[57] ABSTRACT

An anti-skid control device for vehicles having clutch releasing means for automatically releasing a clutch by detecting the state of the wheels and an engine of a vehicle when a braking force releasing signal is produced so that restarting of the rotation of wheels may not be prevented by a constraining torque of the engine after the engine has stopped its operation while the vehicle is running on a slippery surface of a road.

32 Claims, 9 Drawing Figures

ANTI-SKID CONTROL DEVICE FOR VEHICLES WITH CLUTCH RELEASING

CROSS-REFERENCES TO RELATED APPLICATIONS

This application is a continuation-in-part of application Ser. No. 61,407 filed on Aug. 5, 1970 a continuation of application Ser. No. 808,596, filed Mar. 19, 1969, both of which are now abandoned, and Ser. No. 829,901 filed on June 3, 1969 now U.S. Pat. No. 3,653,726.

BACKGROUND OF THE INVENTION

1 Field of the Invention

This invention generally relates to anti-skid devices for vehicles and more particularly to an anti-skid control device for vehicles in which the braking force imparted to a vehicle is released when the angular deceleration of the wheel reaches a predetermined value and in which, when the rotation of the wheel is stopped due to delayed operation of the brake mechanism, the stoppage of rotation of the wheel is detected so that the braking force imparted to the vehicle can be continuously released until the wheel starts to rotate again and the clutch can be continuously released until the driver actuates the clutch again for engagement thereof. Further, this invention relates to an anti-skid device equipped with clutch releasing means which releases the clutch in response to stoppage of rotation of the wheel due to delayed operation of the brake mechanism so as to thereby facilitate the restarting of rotation of the wheel.

2. Description of the Prior Art

Most of the conventional anti-skid control devices for vehicles have been based on an operating principle such that the vehicle is braked to decrease the speed thereof without causing stoppage of rotation of the wheel. In such anti-skid control devices, a flywheel mechanism is employed to detect the angular deceleration of a rotary shaft for driving the wheel which angular deceleration is correlated with the circumferential deceleration in meters/sec$^2$ of the wheel of the vehicle and a hydraulic, electromagnetic or like transmission and driving mechanism is thereby actuated in a direction in which the braking force applied to the wheel is decreased so as to avoid uncontrollable steering, objectional gyration of the vehicle body and other troubles due to abrupt stoppage of rotation of the wheel resulting from the application of an excessively large braking force.

Figure 1:
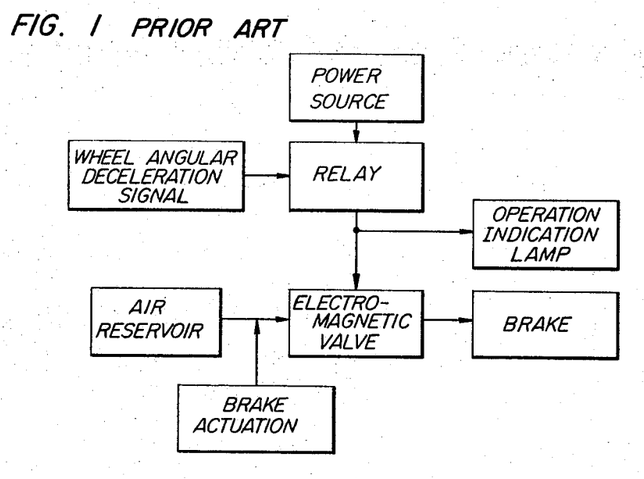
FIG. 1 is a block diagram of an electromagnetic type of anti-skid control device for a vehicle well known in the art.
Figure 2:
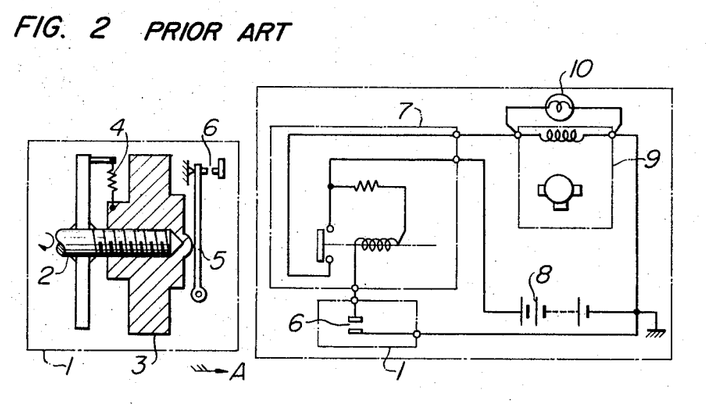
FIG. 2 is an electrical connection diagram of part of the electromagnetic type of anti-skid control device shown in FIG. 1.

FIG. 1 is a block diagram of a conventional anti-skid control device of an electromagnetic type applied to a pneumatic brake system or a pneumatic servo hydraulic brake system, and FIG. 2 is a structural diagram showing the structure of a detector in the device for detecting the angular deceleration of the wheel drive shaft and an electrical connection diagram including the detector. The angular deceleration detector 1 includes a rotary shaft 2 coupled to the wheel drive shaft and a flywheel 3 in threaded engagement with the rotary shaft 2 so that rotary torque is developed in the flywheel 3 when angular deceleration is developed in the rotary shaft 2. When rotary torque is developed in the flywheel 3, relative rotation occurs between the flywheel 3 and the rotary shaft 2 against the force of a return spring 4 and thus the position of the flywheel 3 on the rotary shaft 2 varies. Hence, the flywheel 3 moves in the axial direction of the rotary shaft 2 or in the direction of the arrow A. This movement is magnified by a lever 5 which urges an electrical contact 6 toward an opposite contact. Reference numeral 7 designates a relay which relays a current from a power source 8 to an electromagnetic valve 9 in response to closure of the electrical contact 6. Reference numeral 10 designates an operation indication lamp for indicating that the electromagnetic valve 9 is in its energized state. The electromagnetic valve 9 is of a three-way change-over type. More precisely, the air reservoir communicates with the brake chamber through the brake valve in the de-energized state of the valve 9, while in the energized state of the valve 9, the supply of air from the air reservoir is shut off and the brake chamber communicates with an air discharge port. When the brake is actuated, air is supplied from the air reservoir into the brake chamber through the brake valve to apply a braking force to the wheel. The electromagnetic valve 9 is energized when a predetermined angular deceleration is developed. Consequently, the air pressure in the brake chamber is reduced to lower the braking force and thus the wheel drive shaft is prevented from rotating.

However, due to the fact that the braking force applied to the wheel is released only when a signal representing the angular deceleration of the wheel is generated, such an anti-skid control device is defective in that it has an extremely limited range of braking conditions and the anti-skid control operation cannot be satisfactorily carried out under a widely varying coefficient of friction between the wheel and a road surface such as a road surface paved with concrete or a frozen road surface covered with ice. Suppose, for example, that the detection point for the signal representing the angular deceleration of the wheel is set at a braking force level suitable for a road surface paved with concrete which gives a high coefficient of friction. In such a case, it is inevitable that the wheel is caused to stop in a very short period of time on a frozen road surface covered with ice, even though the braking force applied to the wheel is released, because the air discharge system, including the brake chamber, has a time lag in operation. In this connection, it is to be noted that, in the prior art control device, disappearance of any angular deceleration in the wheel results in the application of the braking force to the wheel again though the rotation of the wheel has already been stopped, and the vehicle may skid with the wheel locked. Further, when the driver does not intend to stop the vehicle but merely intends to reduce the vehicle's speed, the above situation results in stoppage of the engine as well as stoppage of the wheel, since the clutch is substantially in its engaged state. Then when the driver tries to accelerate the vehicle by releasing the braking force applied to the wheel, the vehicle cannot be accelerated unless another driving source is used to start the engine again. Moreover, the necessity of abrupt braking does not allow a sufficient time for releasing the clutch, and a similar case will be encountered when the vehicle is braked with the clutch left in its engaged state. Undesirable stoppage of rotation of the wheel on a frozen road surface covered with ice may be obviated when the detection point for the signal representing the angular deceleration of the wheel is set at a very small angular deceleration. However, this results in a problem that an extremely extended braking distance is required until the vehicle comes to a halt. This problem is especially marked on a road surface paved with concrete and thus the merit of the anti-skid control may thereby be lost.

SUMMARY OF THE INVENTION

It is an object of the present invention to provide an anti-skid control device for a vehicle comprising a wheel angular deceleration detection circuit for detecting the angular deceleration of the wheel, a switch element actuated by the output of said detection circuit so as to supply a current to a braking force releasing valve, and a wheel rotation detection circuit which, when the rotation of the wheel is stopped with said switch element closed, is operative to maintain the supply of a current to said braking force releasing valve until the rotation of the wheel is started again.

In accordance with the present invention, the braking force releasing valve is actuated to release the braking force applied to the vehicle by the output of the wheel angular deceleration detection circuit as soon as brake actuation gives rise to an angular deceleration which is larger than a predetermined detection value of the wheel angular deceleration detection circuit. In addition, in case the rotation of the wheel is stopped due to a delay in the operation of the brake mechanism, the braking force releasing valve can be held operated by the output of the wheel rotation detection circuit in order to continue to release the braking force applied to the vehicle until the rotation of the wheel is started again. Thus, the present invention exhibits an excellent effect in that skidding of the vehicle with its wheel locked can be prevented.

Another object of the present invention is to provide an anti-skid control device for a vehicle of the above character further comprising a second switch element actuated by the output of said wheel rotation detection circuit so as to supply a current to a clutch releasing solenoid, and a third switch element for forcedly stopping the current supplying operation of said second switch element, said second switch element including therein a self-holding circuit which is established by a current flowing through said clutch releasing solenoid.

In accordance with the present invention, the output of the wheel rotation detection circuit is used to continuously operate the braking force releasing valve so as to restart rotation of the wheel from its stopped state, and the output signal of the wheel rotation detection circuit is also supplied to the second switch element to actuate the same. Thus, a current is supplied from the second switch element to the clutch releasing solenoid for releasing the clutch so that the clutch disengages the connection between the wheel from the engine, which is stopped as a result of the instantaneous stoppage of the wheel, in order to facilitate restarting of rotation of the wheel. After the output of the wheel rotation detection circuit disappears, the self-holding circuit established in the second switch element due to the supply of a current to the clutch releasing solenoid holds itself to continuously supply a current to the clutch releasing solenoid until the third switch element is actuated. Thus, the present invention exhibits a marked effect in that the anti-skid control operation can be smoothly performed.

A further object of the present invention is to provide an anti-skid control device for a vehicle comprising a wheel angular deceleration detection circuit for detecting the angular deceleration of the wheel, a first switch element actuated by the output of said detection circuit so as to supply a current simultaneously to a braking force releasing valve and to a clutch releasing solenoid, a self-holding circuit disposed in the circuit of said clutch releasing solenoid, and a second switch element which is opened and closed associated with the actuation of the clutch pedal so as to forcedly stop the supply of a current to said clutch releasing solenoid.

In accordance with the present invention, the braking force releasing valve is actuated to release the braking force applied to the wheel as soon as brake actuation gives rise to an angular deceleration which is larger than a predetermined detection value of the wheel angular deceleration detection circuit, and at the same time, a current is supplied to the clutch releasing solenoid to maintain the clutch in its released state so as to thereby safely and efficiently brake the vehicle without bringing forth undesirable stoppage of the wheel with a resultant stoppage of the engine. In addition, when it is desired to accelerate the vehicle upon completion of the anti-skid operation, the second switch element may be merely actuated to accelerate the vehicle, thus eliminating the troublesome steps encountered with the prior art devices in which other source of driving force must be employed to drive the engine again which has stopped running due to the stoppage of the rotation of the wheel.

A yet further object of the present invention is to provide an anti-skid control device for a vehicle of the above character further comprising a wheel rotation detection circuit which, when the rotation of the wheel is stopped with said first switch element closed, is operative in maintaining the supply of current to said braking force releasing valve until the rotation of the wheel is restarted.

In accordance with the present invention, the braking force releasing valve, once actuated, is maintained in its actuated state by the output of the wheel rotation detection circuit even after the output of the wheel angular deceleration detection circuit has disappeared due to stoppage of rotation of the wheel as a result of a delay in the operation of the brake mechanism, and at the same time, the self-holding circuit disposed in the circuit of the clutch releasing solenoid which is now energized acts to maintain the clutch in its released state so that the wheel can be very easily rotated again. Thus, the present invention exhibits a remarkable effect to prevent skidding of the vehicle with its wheel locked, even though the braking force is released, due to the stoppage of the engine caused by the engaged clutch when the wheels stops its rotation.

A still further object of the present invention is to provide an anti-skid control system for vehicles which is provided with clutch releasing means, comprising a wheel angular deceleration of a wheel, a switch element operable by the output of the detection circuit to energize a braking force releasing valve, a wheel rotation detection circuit adapted so that when the wheel stops rotating upon closing of the switch element, the circuit detects the stoppage of rotation of the wheel and maintains the braking force releasing valve energized until the wheel starts rotating again, an AND circuit for performing a logical operation on the signal from the detection circuit and the signal derived from the opening and closing of a brake switch, a switch element adapted to enerize a clutch releasing solenoid with the output of the AND circuit, a self-holding circuit operable upon closing of the switch element to maintain the continued energization of the clutch releasing solenoid even after the output of the AND circuit has vanished, and a switching element for forcibly stopping the operation of the self-holding circuit.

According to the present invention, the instant the braking operation produces an angular deceleration of the wheel in excess of a predetermined corresponding value set in the wheel angular deceleration detecting circuit, the braking force releasing valve is actuated by the output of the said detection circuit, whereby not only the braking force on the vehicle can be released, but also, if the rotation of the wheel is stopped due to a delay in the action of the braking mechanism or the like, the brake releasing valve is operated by the output of the wheel rotation detection circuit to permit continued releasing of the braking force on the vehicle, while the clutch releasing solenoid is actuated by the output of the AND circuit to disengage the clutch so that the wheel may easily restart its rotation. Thus, the system is highly advantageous in that the vehicle will not be allowed to skid while the wheels do not rotate due to the stoppage of the operation of the engine.

DESCRIPTION OF THE PREFERRED EMBODIMENTS

Figures 3, 4:
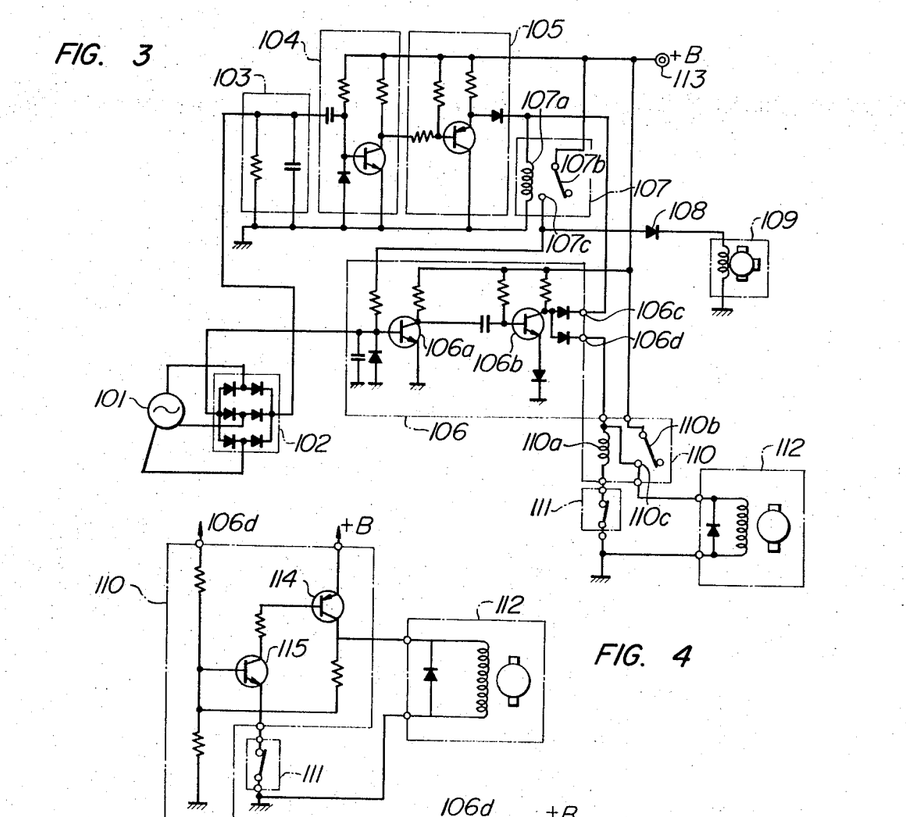
FIG. 3 is an electrical connection diagram of an embodiment of the anti-skid control device according to the present invention.
FIGS. 4 and 5 are electrical connection diagrams showing parts of other embodiments of the anti-skid control device according to the present invention.

Referring to FIG. 3, the anti-skid control device according to the present invention includes a three-phase A.C. generator 101 whose rotor is rotated at a speed proportional to the rotating speed of the wheel of a vehicle so as to generate an A.C. voltage proportional to the rotating speed of the wheel. The A.C. voltage generated by the A.C. generator 101 is rectified by a three-phase full-wave rectifying circuit 102. Reference numeral 103 designates a smoothing circuit which eliminates A.C. components in the voltage rectified by the rectifying circuit 102 for obtaining a smoothed D.C. voltage. Reference numeral 104 designates a wheel angular deceleration detection circuit which is operated by the D.C. voltage supplied from the smoothing circuit 103. A switching circuit 105 is urged to its cut-off state in response to detection of an angular deceleration by the angular deceleration detection circuit 104. Reference numeral 106 designates a wheel rotation detection circuit which includes an input transistor 106a, an output transistor 106b, and output terminal 106c and 106d. Reference numeral 107 designates a first switch element which includes an energizing coil 107a, a movable contact 107b urged by the electromagnetic force of attraction developed by the energizing coil 107a, and a stationary contact 107c disposed opposite to the movable contact 107b. Although a relay is used to form the first switch element 107 in the embodiment shown in FIG. 3, the relay may be replaced by another switching element, such as a transistor. Reference numeral 108 designates a diode. Reference numeral 109 designates a braking force releasing valve which operates in response to closure between the movable contact 107b and the stationary contact 107c so as to release the braking force applied to the vehicle. Reference numeral 110 designates a second switch element which includes an energizing coil 110a, a movable contact 110b, and a stationary contact 110c disposed opposite to the movable contact 110b. Reference numeral 111 designates a third switch element which is provided to forcedly stop the current supplying operation of the second switch element 110. The third switch element 111 is in the form of a push button switch which is normally closed. Reference numeral 112 designates a clutch releasing solenoid which acts to release a clutch (not shown) when the movable contact 110b is brought into contact with the stationary contact 110c. Reference numeral 113 designates a terminal which is connected to the positive electrode of a storage battery mounted on the vehicle.

The operation of the device of the present invention having the above-described structure will be described hereunder. Suppose that the rotation of the wheel is reduced with an angular deceleration which is larger than a given angular deceleration and thereafter the rotation of the wheel is stopped. As the rotating speed of the wheel is reduced, the output voltage of the three-phase A.C. generator 101 is also reduced, and as a result, the D.C. voltage appearing at the output terminal of the smoothing circuit 103 is reduced. When the D.C. voltage appearing at the output terminal of the smoothing circuit 103 is reduced at a rate which is higher than a fixed value determined by the wheel angular deceleration detection circuit 104, a deceleration signal is delivered from the deceleration detection circuit 104 to urge the switching circuit 105 to its cut-off state. Consequently, a current is supplied to the energizing coil 107a of the first switch element 107 so that the movable contact 107b is brought into contact with the stationary contact 107c and a current is supplied to the braking force releasing valve 109 through the diode 108. When thereafter the rotation of the wheel is stopped due to a delay in the operation of the brake mechanism, the wheel rotation detection circuit 106 detects the stoppage of rotation of the wheel and a signal voltage appears at the output terminal 106c of the wheel rotation detection circuit 106. In this case, the deceleration signal is no longer delivered from the wheel angular deceleration detection circuit 104 because the wheel has stopped its rotation. However, the energizing coil 107a is continuously supplied with a current by the signal voltage appearing at the output terminal 106c of the wheel rotation detection circuit 106 until the rotation of the wheel is restarted. Thus, the movable contact 107b is maintained in its contacting state with the stationary contact 107c and the braking force releasing valve 109 is maintained in its braking force releasing position. Further, due to the fact that the signal voltage also appears at another output terminal 106d, a current is supplied to the energizing coil 110a of the second switch element 110 so that the movable contact 110b is brought into contact with the stationary contact 110c to supply a current to the clutch releasing solenoid 112. Therefore, the clutch is released to cause the disconnection between the wheel and the engine which is brought to a halt as a result of the instantaneous stoppage of rotation of the wheel, thereby facilitating the restarting of rotation of the wheel. As the movable contact 110b is brought into contact with the stationary contact 110c and a current is supplied to the clutch releasing solenoid 112, a self-holding circuit is established which is traced from the movable contact 110b, stationary contact 110c and energizing coil 110a to the third switch element 111. As a result, a current is continuously supplied to the clutch releasing solenoid 112 even after the signal voltage at the output terminal 106d has disappeared. Thereafter, each time the wheel rotation is stopped in the course of the anti-skid control operation, the wheel rotation detection circuit 106 and the first switch element 107 are operated to facilitate the restarting of rotation of the wheel thereby ensuring a satisfactory anti-skid control operation. Upon completion of the anti-skid control operation, the driver may temporarily urge the third switch element 111 to its open position so as to forcedly break the current supply to the solenoid 112 and to restore the clutch to its engaged state.

Although a relay is used to form the second switch element 110 in the embodiment shown in FIG. 3, the second switch element 110 may be constituted of two transistors 114 and 115 as shown in FIG. 4. In a modification shown in FIG. 4, the emitter of the transistor 114 is connected to the terminal 113, while the base of the transistor 115 is connected through a resistor to the output terminal 106d of the wheel rotation detection circuit 106. The operation of the second switch element 110 shown in FIG. 4 will now be described. An output signal appears at the output terminal 106d of the wheel rotation detection circuit 106 in response to stoppage of rotation of the wheel and the transistors 114 and 115 are thereby urged to their conducting state. The collector current of the transistor 114 is supplied to the clutch releasing solenoid 112 to release the clutch. As the wheel starts its rotation and the output signal at the output terminal 106d disappears, a part of the collector current of the transistor 114 flows to the base of the transistor 115 so that a self-holding circuit is established to perform a self-holding operation.

Figure 5:
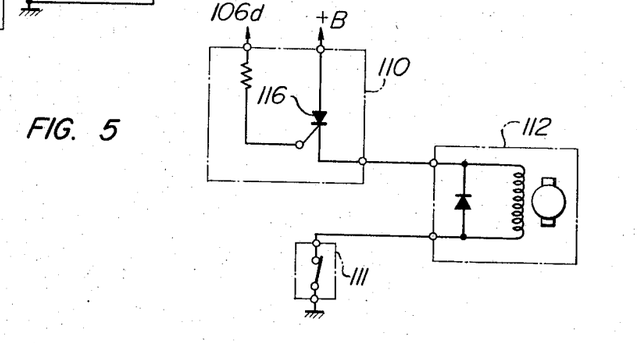

The second switch element 110 shown in FIG. 3 may be in the form of a silicon controlled rectifier 116 as shown in FIG. 5. In a modification shown in FIG. 5, the anode and gate of the silicon controlled rectifier 116 are connected to the terminal 113 and the output terminal 106d of the wheel rotation detection circuit 106, respectively. The operation of the second switch element 110 shown in FIG. 5 will now be described. An output signal appears at the output terminal 106d of the wheel rotation detection circuit 106 in response to stoppage of rotation of the wheel and is supplied to the gate of the silicon controlled rectifier 116 as a gating signal thereby urging the silicon controlled rectifier 116 to its conductive state. The clutch releasing solenoid 112 is thereby energized to release the clutch. Needless to say, the silicon controlled rectifier 116 is maintained in its conductive state even in the absence of any gating signal once it is turned on. Thus, the silicon controlled rectifier 116 itself constitutes a self-holding circuit and performs a self-holding operation.

Figures 6, 7:
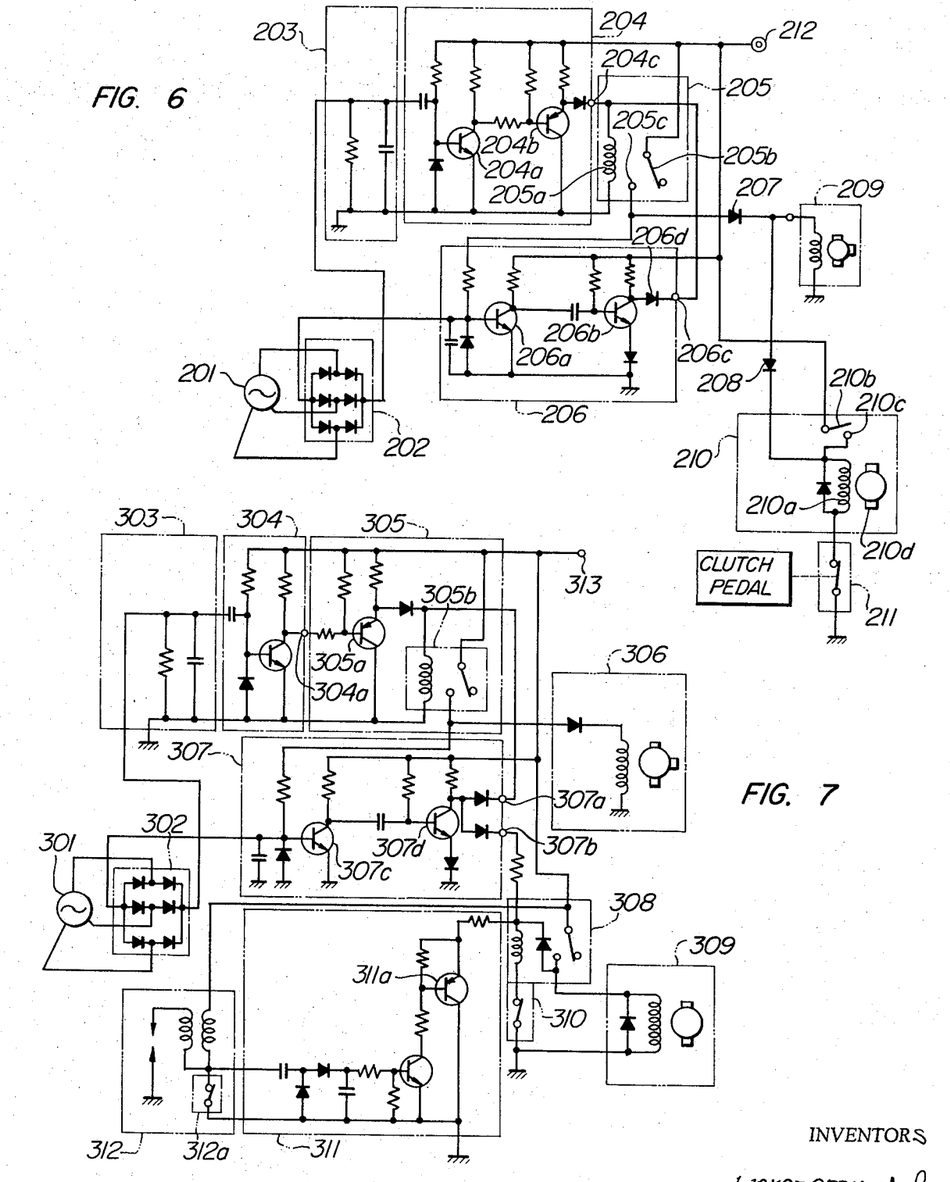
FIG. 6 is an electrical connection diagram of another embodiment of the anti-skid control device according to the present invention.
FIG. 7 is an electrical connection diagram of an embodiment of the anti-skid control device equipped with clutch releasing means according to the present invention.

Now, referring to FIG. 6, another embodiment of the anti-skid control device according to the present invention includes a three-phase A.C. generator 201 whose rotor is rotated at a speed proportional to the rotating speed of the wheel of a vehicle so as to generate an A.C. voltage proportional to the rotating speed of the wheel. The A.C. voltage generated by the A.C. generator 201 is rectified by a three-phase fullwave rectifying circuit 202. Reference numeral 203 designates a smoothing circuit which eliminates A.C. components in the voltage rectified by the rectifying circuit 202 for obtaining a D.C. voltage. Reference numeral 204 designates a wheel angular deceleration detection circuit which is operated by the D.C. voltage supplied from the smooth circuit 203. The wheel angular deceleration detection circuit 204 includes a deceleration detecting transistor 204a, a switching transistor 204b and an output terminal 204c. Reference numeral 205 designates a first switch element which includes an energizing coil 205a, a movable contact 205b urged by the electromagnetic force of attraction developed by the energizing coil 205a, and a stationary contact 205c disposed opposite to the movable contact 205b. Although a relay is used to form the first switch element 205 in the embodiment shown in FIG. 6, the relay may be replaced by another switch element, such as a transistor. Reference numeral 206 designates a wheel rotation detection circuit which includes a wheel rotation detecting transistor 206a, a switching transistor 206b, an output diode 206c and an output terminal 206c. Reference numerals 207 and 208 designate diodes. Reference numeral 209 designates a braking force releasing valve which operates in response to the engagement of the movable contact 205b with the stationary contact 205c to release the braking force applied to the vehicle. Reference numeral 210 designates a clutch releasing solenoid which includes an energizing coil 210a, a movable contact 210b urged by the electromagnetic force of attraction developed by the energizing coil 210a, a stationary contact 210c disposed opposite to the movable contact 210b, and an armature 210d connected to a clutch (not shown). Thus, when a current is supplied to the energizing coil 210a, the armature 210d is attracted by the electromagnetic force of attraction developed by the energizing coil 210a to release the clutch. Reference numeral 211 designates a normally-closed second switch element which is urged to its opened position when the driver actuates the clutch pedal to release the clutch.

The operation of the device of the present invention shown in FIG. 6 will now be described. Suppose that the rotation of the wheel is reduced with an angular deceleration which is larger than a fixed angular deceleration value and thereafter the rotation of the wheel is stopped. As the rotating speed of the wheel is reduced, the output voltage of the three-phase A.C. generator 201 is also reduced, and as a result, the D.C. voltage appearing at the output terminal of the smoothing circuit 203 is reduced. When the D.C. voltage appearing at the output terminal of the smoothing circuit 203 is reduced at a rate which is greater than a fixed value determined by the wheel angular deceleration detection circuit 204, the deceleration detecting transistor 204a and the switching transistor 204b in the wheel angular deceleration detection circuit 204 are urged to their cut-off state so that a current is supplied to the energizing coil 205a through the terminal 204c from a terminal 212 and the movable contact 205b is thereby brought into contact with the stationary contact 205c. Consequently, a current is supplied from the terminal 212 to the braking force releasing valve 209 through the contacts 205b, 205c and the diode 207 and the valve 209 is operated in a direction in which the braking force applied to the vehicle is released. Simultaneously with the above operation, the current is also supplied to the energizing coil 210a of the clutch releasing solenoid 210 through the diode 208 to release the clutch. Since the movable contact 210b is brought into contact with the stationary contact 210c by the current supplied to the energizing coil 210a, a self-holding circuit is established which can continuously maintain the current supply to the energizing coil 210a even after the angular deceleration has disappeared in the wheel due to releasing of the braking force applied to the vehicle by the supply of a current to the braking force releasing valve 209. When the rotation of the wheel is stopped due to delayed operation of the brake mechanism, though the braking force releasing valve 209 has been actuated, the wheel rotation detection circuit 206 detects the stoppage of rotation of the wheel, and as a result, a signal voltage appears at the output terminal 206c thereof. Thus, although a signal voltage is no longer delivered from the wheel angular deceleration detection circuit 204 as the wheel has stopped its rotation, the energizing coil 205a is continuously supplied with a current by the signal voltage appearing at the output terminal 206c of the wheel rotation detection circuit 206 until the wheel restarts its rotation. Thus, the movable contact 205b is maintained in contact with the stationary contact 205c and the braking force releasing valve 209 is maintained in its braking force releasing position. Since the energizing coil 210a is also continuously supplied with a current to maintain the clutch in its released state, the wheel can restart its rotation very easily. Upon completion of the anti-skid control operation, the driver actuates the clutch to stop the current supply to the energizing coil 210a and thereafter the clutch can be freely released or engaged by the actuation of the clutch pedal.

With the embodiment shown in FIG. 6, the wheel rotation detection circuit 206 employs a single output diode 206d and this diode is adapted to energize only the braking force releasing coil 205a, so that the clutch releasing coil 210a is fed by the power source by way of the contacts 205b and 205c of the first switch element 205. This permits continued releasing of braking force while the wheel stops rotating, on the other hand, the clutch may be maintained in its released position only when braking force is released, and the clutch remains in its released position until the releasing of braking force is terminated. This device is advantageous in a case where the coefficient of friction μ of a road surface is moderate and the wheel, which has stopped rotating, can easily restart its rotation. At the time, this system has an advantage to make use of engine braking in combination with the application of a brake to thereby effectively bring a vehicle to a halt.

Referring to FIG. 7, a further embodiment of the anti-skid control device according to the present invention includes an A.C. generator 301 which generates an A.C. voltage proportional to the rotating speed of the wheel of a vehicle. The A.C. voltage generated by the A.C. generator 301 is rectified by a rectifying circuit 302. Reference numeral 303 designates a smoothing circuit which smoothes out a pulsating voltage delivered from the rectifying circuit 302. Reference numeral 304 designates a differentiation circuit which is operated by the D.C. voltage supplied from the smoothing circuit 303 so that an output signal voltage appears at its output terminal 304a when the circumferential deceleration of the wheel reaches a predetermined value. The A.C. generator 301, the rectifying circuit 302, the smoothing circuit 303 and the differentiation circuit 304 described above constitute a wheel circumferential deceleration detector. Reference numeral 305 designates a switch element which includes a transistor 305a urged to its cut-off state in response to the appearance of an output signal voltage at the output terminal 304a of the differentiation circuit 304, and a relay 305b urged to its closed position in response to cutting-off of the transistor 305a. Reference numeral 306 designates a braking force releasing element which operates in response to the closure of the relay 305b to release the braking force applied to the vehicle. Reference numeral 307 designates a wheel rotation detection circuit which is so constructed that an output signal voltage appears at its output terminals 307a and 307b when the rotation of the wheel is stopped under the condition that the circumferential deceleration of the wheel exceeds the predetermined value and a current is supplied to the braking force releasing element 306. When an output signal voltage appears at the output terminal 307a, the relay 305b can be continuously maintained in its closed state until the wheel restarts its rotation again, even after the output signal voltage appearing at the output terminal 304a of the differentiation circuit 304 has disappeared. Reference numerals 308 and 309 designate a switch element and a clutch releasing element, respectively. Reference numeral 310 designates a normally-closed switch element which can be urged to its opened position by the actuation of the driver. Reference numeral 311 designates an engine rotation detection circuit having a transistor 311a which is urged to its cut-off state in response to the stoppage of the engine. Reference numeral 312 designates an ignition means of the engine. The ignition means 312 includes a distributor contact unit 312a. Reference numeral 313 designates a terminal connected to a storage battery (not shown) mounted on the vehicle.

The operation of the device of the present invention shown in FIG. 7 will now be described. When the circumferential deceleration of the wheel exceeds the predetermined value and thereafter the rotation of the wheel is stopped, a current is supplied to the braking force releasing element 306 until the wheel starts to rotate again. In such a case, the rotation of the engine will be stopped simultaneously with the stoppage of the rotation of the wheel unless the driver actuates the clutch to release the same. Accordingly, the distributor contact unit 312a in the ignition means 312 does not perform its current-interrupting operation and the transistor 311a in the engine rotation detection circuit 311 is turned to its cut-off state from the previous conducting state. Consequently, the switch element 308 is urged to its closed state by the output signal voltage appearing at the output terminal 307b of the wheel rotation detection circuit 307 to supply a current to the clutch releasing element 309 for releasing the clutch. Upon completion of the anti-skid control operation, the driver may open the switch 310 to cut off the supply of the current to the clutch releasing element 309 for bringing the clutch to its engaged state again. When the rotation of the wheel is stopped but the engine still continues to rotate, that is, when the driver actuates the clutch to release the same, no current flows through the switch element 308, hence no current is supplied to the clutch releasing element 309 because the transistor 311a is in its conducting state to short-circuit the switch element 308. Further, when the driver releases the clutch and then intentionally stops the rotation of the engine while the vehicle is running, no current is supplied to the clutch releasing element 309 because no output signal appears at the output terminal 307b though the transistor 311a is turned to its cut-off state.

Figure 8:
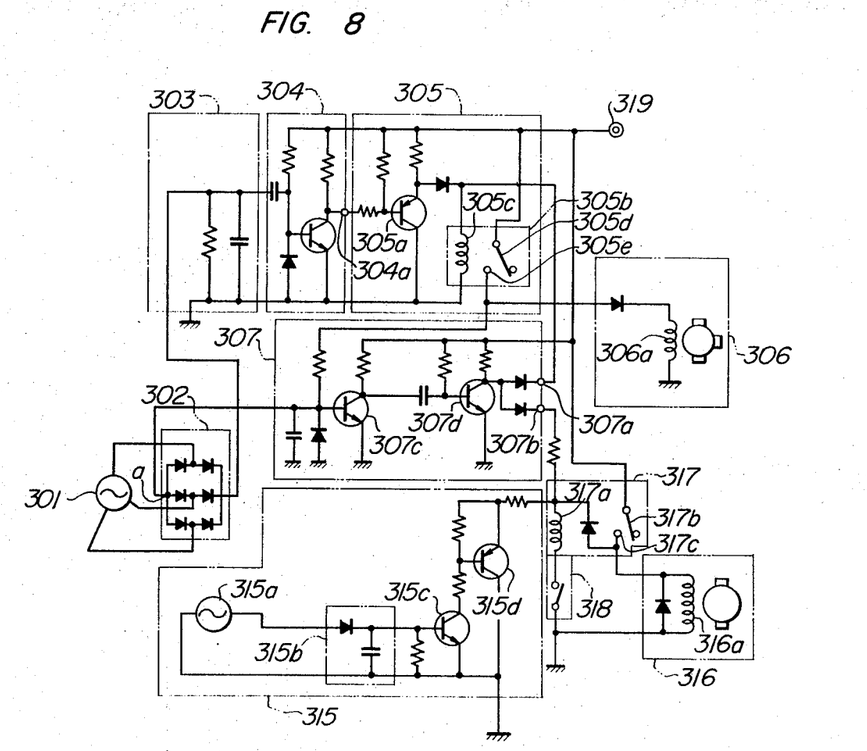
FIG. 8 is an electrical connection diagram of another embodiment of the anti-skid control device equipped with clutch releasing means according to the present invention.

Referring to FIG. 8, a still further embodiment of the anti-skid control device according to the present invention includes an A.C. generator 301 which generates an A.C. voltage proportional to the rotating speed of the wheel of a vehicle. The A.C. voltage generated by the A.C. generator 301 is rectified by a rectifying circuit 302. Reference numeral 303 designates a smoothing circuit which smoothes out the pulsating voltage delivered from the rectifying circuit 302. Reference numeral 304 designates a differentiation circuit which detects a variation in the smoothed D.C. voltage delivered from the smoothing circuit 303. More precisely, the differentiation circuit 304 detects the circumferential deceleration of the wheel which is obtained by differentiating the circumferential speed of the wheel with time. When the detected circumferential deceleration of the wheel reaches a predetermined value, a signal voltage appears at an output terminal 304a of the differentiation circuit 304 to forcibly release the braking force applied to the wheel. The A.C. generator 301, the rectifying circuit 302, the smoothing circuit 303 and the differentiation circuit 304 described above constitute a wheel circumferential deceleration detector or lock detector which is operated at the moment immediately before the wheel is locked due to an excessively large braking force. Reference numeral 305 designates a switch element which includes a transistor 305a urged to its cut-off state in response to the appearance of an output signal voltage at the output terminal 304a of the differentiation circuit 304, and a relay 305b urged to its closed position in response to cutting-off of the transistor 305a. The relay 305b includes an energizing coil 305c, a movable contact 305d and a stationary contact 305e. Reference numeral 306 designates a braking force releasing element which includes an energizing coil 306a. When the differentiation circuit 304 delivers a signal for forcibly releasing the braking force, a current is supplied to the energizing coil 305c of the relay 305b thereby bringing the movable contact 305d into contact with the stationary contact 305e, a current then supplied to the energizing coil 306a of the braking force releasing element 306 so that the releasing element 306 may operate to forcibly release the braking force independently of the will of the driver to release the braking force with manual power. Reference numeral 307 designates a wheel rotation detection circuit which detects whether or not the wheel is rotating. The wheel rotation detection circuit 307 includes two switching transistors 307c and 307d, and output terminals 307a and 307b connected to the collector of the transistor 307d. When the A.C. generator 301 is generating a voltage, that is, when the wheel is rotating, a negative voltage appearing at the negative electrode terminal a of the rectifying circuit 302 is applied to the base of the transistor 307c in the first stage of the wheel rotation detection circuit 307 and the transistor 307c is in its cut-off state. Therefore, the transistor 307d in the last stage thereof is in its conducting state and a voltage substantially equal to zero volt appears at the output terminals 307a and 307b to indicate that the wheel is rotating. Further, when the wheel is locked the signal for forcibly releasing the braking force is delivered from the differentiation circuit 304 to urge the relay 305b to its closed state and a current is thereby supplied to the energizing coil 306a of the braking force releasing element 306. A positive current current is also supplied from a power source through the relay 305b to the base of the transistor 307c in the first stage of the wheel rotation detection circuit 307 to urge the transistor 307c to its conducting state, and as a result, the transistor 307d in the last stage is urged to its cutoff state so that a voltage substantially equal to the power supply voltage appears at the output terminals 307a and 307b to indicate that the wheel is locked. In the above case, a current is continuously supplied from the output terminal 307a to the energizing coil 305c of the relay 305b in order to maintain the closed state of the relay 305b until the wheel starts it rotation again, even after the output signal voltage at the output terminal 304a of the differentiation circuit 304 has disappeared due to the stoppage of rotation of the wheel. Reference numeral 315 designates an engine rotation detection circuit which detects whether or not the engine is rotating. The engine rotation detection circuit 315 includes a generator 315a driven in association with the rotation of the engine, a rectifying and smoothing circuit 315b connected to the output terminal of the generator 315a, and transistors 315c and 315d connected to the output terminal of the rectifying and smoothing circuit 315b. It is so arranged that the transistors 315c and 315d are in their conducting state when the generator 315a is generating a voltage, that is. when the engine is rotating, and they are in their cutoff state when the generator 315a ceases to generate a voltage, that is, when the engine ceases its rotation. Reference numeral 316 designates a clutch releasing element which includes an energizing coil 316a. The clutch releasing element 316 is such that, when a current is supplied to the energization coil 316a, the clutch in its engaged state is forcedly released independently of the will of the driver to release the clutch with manual power. Reference numeral 317 designates a relay having a selfholding circuit therein. The relay 317 includes an energizing coil 317a, a movable contact 317b, and a stationary contact 317c connected to the energizing coil 316a of the clutch releasing element 316. When the wheel is locked and the rotation of the engine is also stopped, a signal voltage appears at the output terminal 307b of the wheel rotation detection circuit 307 and the transistors 315c and 315d in the engine rotation detection circuit 315 are urged to their cut-off state, that is, the differentiation circuit 304 has delivered a signal to forcibly release the braking force, a current is supplied to the energizing coil 317a of the relay 317 to bring the movable contact 317b into contact with the stationary contact 317c to thereby supply a current to the energizing coil 316a of the clutch releasing element 316, and at the same time, the relay 317 holds itself to maintain its closed state thereby to continuously supply a current to the energizing coil 316a until its self-holding operation is released. Reference numeral 318 designates a normally-closed switch element which, when temporarily opened by the driver, acts to release the self-holding operation of the relay 317 to thereby stop the supply of a current to the energizing coil 316a and to restore the clutch to its engaged state. Reference numeral 319 designates a terminal connected to the positive electrode of a storage battery mounted on the vehicle.

The operation of the device of the present invention shown in FIG. 8 will now be described. The lock detector detects the circumferential deceleration developed in the wheel due to the braking operation by the driver. When the circumferential deceleration exceeds a predetermined value, the differentiation circuit 304 delivers a signal for forcibly releasing the braking force, and a current is thereby supplied to the energizing coil 305c of the relay 305b to bring the movable contact 305d into contact with the stationary contact 305e. A current is thereby supplied to the energizing coil 306a of the braking force releasing element 306 to forcibly release the braking force applied to the wheel. However, a delay in the operation of the brake mechanism may result in a case where the braking force cannot instantaneously be released and the wheel is locked though a current is supplied to the energizing coil 306a of the braking force releasing element 306. In such a case, due to the stoppage of rotation of the A.C. generator 301 and the closure of the relay 305b, a base current is supplied, from the power source to the base of the transistor 307c in the wheel rotation detection circuit 307 to thereby urge the transistor 307c to its conducting state. This is followed by cutting-off of the succeeding transistor 307d, and a signal voltage substantially equal to the power supply voltage appears at the output terminals 307a and 307b. A current caused by the signal voltage appearing at the output terminal 307a flows into the energizing coil 305c of the relay 305b to maintain the relay 305b in its closed state even after the wheel has been locked, and no output signal is delivered from the lock detector. Thus, a current is continuously supplied to the energizing coil 306a of the braking force releasing element 306 so as to continuously release the braking force. After a certain delay time which depends on the delayed operation of the brake mechanism, the braking force releasing element 306 acts to forcibly release the braking force, and as a result, the locked wheel is released from its locked state and starts to rotate again. The relay 305b is maintained in its closed state for the above-described period of time. As soon as the wheel restarts its rotation, a negative voltage is applied again to the base of the transistor 307c in the wheel rotation detection circuit 307 and the transistor 307d is urged to its conducting state so that a signal voltage substantially equal to zero volt appears at the output terminal 307a.

Suppose a case where the brake is actuated without releasing the clutch and the wheel is locked, since abrupt braking is required and there is not sufficient time to release the clutch. In such a case, the rotation of the engine is stopped simultaneously with the locking of the wheel because the engine is connected to the wheel through the clutch. The generator 315a ceases to generate a voltage and the transistors 315c and 315d are urged to their cut-off state. A current caused by a signal voltage appearing at the output terminal 307b of the wheel rotation detection circuit 307 due to the locking of the wheel flows through the energizing coil 317a of the relay 317 to bring the movable contact 317b into contact with the stationary contact 317c, thereby supplying a current to the energizing coil 316a of the clutch releasing element 316 for forcibly releasing the clutch. Thus, the wheel will not be loaded with the stopped engine, but is only loaded with the vehicle body. The released state of the clutch is maintained by the self-holding operation of the relay 317 until the switch element 318 is urged to its opened position. After a certain delay time which depends on the delayed operation of the brake mechanism, the braking force releasing element 306 releases the braking force applied to the wheel and the wheel receives a rotational force from the vehicle body which is advancing by the force of inertia. Thus, the wheel can easily restart its rotation even on a road surface such as a frozen road surface covered with ice which has a small coefficient of friction therebetween, and undesirable skidding of the vehicle with its wheel locked can be positively prevented. When it is required to engage the clutch in order to accelerate the vehicle, the switch element 318 may be temporarily urged to its opened position to release the self-holding operation of the relay 317. More precisely, by opening the current path to the energizing coil 317a of the relay 317, the supply of a current to the energizing coil 316a of the clutch releasing element 316 is stopped and the clutch is then engaged.

When the wheel is locked, but the engine does not cease its rotation, that is, when the driver releases the clutch and actuates the brake to result in the locking of the wheel, the transistors 315c and 315d in the engine rotation detection circuit 315 are in their conducting state because the engine is rotating. In this case, no current is supplied to the energizing coil 317a of the relay 317 and hence no current is supplied to the energizing coil 316a of the clutch releasing element 316, thus preventing any malfunctioning. Further, suppose a case where the driver intentionally stops the rotation of the engine after releasing the clutch even when the vehicle is running. In such a case, although the transistors 315c and 315d in the engine rotation detection circuit 315 are urged to their cut-off state, no output signal appears at the output terminals 307a and 307b of the wheel rotation detection circuit 307 and hence no current is supplied to the energizing coil 316a of the clutch releasing element 316, since the wheel continues rotating.

The generator 315a in the engine rotation detection circuit 315 in the embodiment shown in FIG. 8 may be on especially provided for the purpose. However, an existing generator for charging a storage battery may be employed for this purpose in lieu of the generator 315a. This is very economical, as there is no need to provide for a space for disposing such a special generator. Although the generator 315a in the embodiment shown in FIG. 8 is in the form an A.C. generator, it will be understood that a D.C. generator, a pulse generator or the like may be employed in lieu of an A.C. generator. It should be noted that, when it is desired that the device may have a function such that no clutch releasing operation is permitted when the engine is running, the engine rotation detection circuit as designated by numeral 311 in FIG. 7 or by numeral 35 in FIG. 8 may be suitably applied to the circuits of the embodiments shown in FIGS. 3 and 6 as well as to the circuit of an embodiment shown in FIG. 9 which will be explained later. Further, in the embodiment shown in FIG. 8, a lock detector of such a kind is employed that it derives the circumferential speed of the wheel as an electrical quantity and electrically differentiates the quantity to obtain a circumferential deceleration thereby detecting the moment immediately before locking of the wheel takes place. However, it will be understood that the lock detector may be such that it detects electrically or mechanically a slip ratio of the wheel, the deceleration of the vehicle body or the relation between the deceleration of the vehicle body and the circumferential deceleration of the wheel to thereby detect the moment immediately before the locking of the wheel takes place.

The employment of two output diodes, as shown in the embodiments of FIGS. 7 and 8, for the purpose of disengaging the clutch when the wheel has stopped rotating and maintaining the clutch in its released position even after the wheel has restarted its rotation, can bring an advantage of ensuring an effective anti-skid operation on a road surface having a low coefficient of friction. That is, by maintaining the clutch in its released position, the rotation of the wheel may be readily restarted on a road surface where the coefficient of friction $\mu$ is small and hence the wheel, which has once stopped rotating, cannot easily restart its rotation.

Next, the present invention will be described with reference to a yet further embodiment of the anti-skid control device according to the present invention shown in FIG. 9. Numeral 401 designates a three-phase A.C. generator provided with a rotor which rotates at a speed which is proportional to the rotational speed of the wheel such that the generator produces an A.C. voltage which is proportional to the rotational speed of the wheel. Numeral 402 designates a three-phase full-wave rectifier circuit, and 403 a smoothing circuit which removes A.C. components included in the D.C. voltage rectified by the rectifier circuit 402. Numeral 404 designates a wheel angular deceleration detection circuit operated by the D.C. voltage; 405 a switching circuit which is cut off when a wheel angular deceleration is detected by the wheel angular deceleration detection circuit 404. Numeral 406 designates a wheel rotation detection circuit which detects whether the wheel is rotating or not; 406a an input transistor, 406b an output transistor and 406c an output terminal of the wheel rotation detection circuit 406, respectively. Numeral 407 is a first switch element; 407a an energizing coil, 407b a movable contact moved by the electromagnetic attraction of the energizing coil 407a, and 407c a stationary contact disposed opposite to the movable contact 407b. It should be noted here that although a relay is employed as the first switch element in this embodiment, this relay may be replaced with other switch elements, such as a transistor or the like. Numeral 408 refers to a diode and 409 refers to a braking force releasing valve which is operated to release the braking force applied to the vehicle when the movable contact 407b and the stationary contact 407c are brought into contact with each other. Numeral 460 refers to a brake switch which is closed when the vehicle is braked. Numeral 461 designates an AND circuit which performs a logical operation on a signal from said output terminal 406c and a signal generated by the make-and-brake operation of the brake switch 460. Numeral 410 is a second switch element; 410a an energizing coil, 410b a movable contact, and 410c a stationary contact disposed opposite to the movable contact 410b of the second switch element 410, respectively. In the arrangement described above, when the AND circuit 461 conducts, the energizing coil 410a is energized and the movable contact 410b and the stationary contact 410c are engaged. Although a relay is employed for the second switch element 410 in this embodiment as stated above, other switch elements such as a transistor may be employed in place of the relay. Numeral 463 is a self-holding circuit which holds the energizing coil 410a in its conducting state when contact has been established between the movable contact 410b and the stationary contact 410c and thereafter the output of the AND circuit 461 has vanished. Numeral 411 is a switch element to forcibly stop the holding action of the self-holding circuit 463 and a normally closed push-button switch is employed for this switch element. Numeral 412 is a clutch releasing solenoid which disengages the clutch (not shown) upon engaging the movable contact 410b with the stationary contact 410c. Numeral 413 is a terminal for connection to a positive electrode of a source storage battery (not shown) which is mounted on the vehicle.

Figure 9:
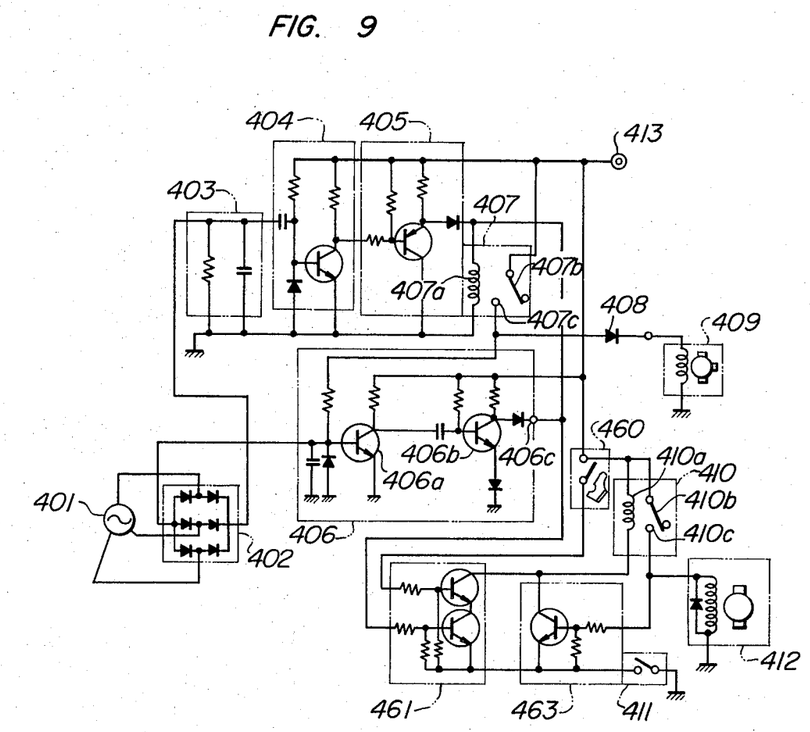
FIG. 9 is an electrical connection diagram of a further embodiment of the anti-skid control device equipped with clutch releasing means according to the present invention.

While the wheel rotation detection circuits (106 and 307) in the embodiments shown in FIGS. 3, 7 and 8 employ two output diodes, the wheel rotation detection circuits (206 and 406) in the embodiments of FIGS. 6 and 9 employ a single output diode. However, this difference in the number of the output diode employed causes no significant difference in the functional effect of these circuits. Depending on the current capacity, etc. of a diode employed, the wheel rotation detection circuit in the embodiment shown in FIG. 9, for example, may also employ two output diodes so that these diodes may energize the coil 407a and the coil 410a by way of the AND circuit 461, respectively.

Now the operation of the system shown in FIG. 9 according to the present invention having a construction such as described above will be explained hereinafter. First, assume that the rotational speed of the wheel (not shown) drops by an angular deceleration in excess of a predetermined angular deceleration value and then the wheel stops rotating. This reduction in the rotational speed of the wheel is accompanied by a reduction in the output voltage of the three-phase A.C. generator 401 which is proportional to the rotational speed of the wheel. Accordingly, the rectified and smoothed D.C. voltage at the output terminal of the smoothing circuit 403 drops. Then, if the output D.C. voltage of the smoothing circuit 403 drops at a rate greater than a predetermined value which is determined by the wheel angular deceleration detection circuit 404, this wheel angular deceleration detection circuit 404 produces a deceleration signal to cut off the switching circuit 405, thereby energizing the exciting coil 407a. The movable contact 407b and the stationary contact 407c are thereby engaged with each other to energize the braking force releasing valve 409 through a diode 408 and to enable the wheel rotation detection circuit 406 by supplying a base current to the transistor 406a from the power source connected to the terminal 413, thereby urging the transistor 406a toward but not into its conducting state and the transistor 406b toward but not to its non-conducting state. Subsequently, when the wheel stops rotating, the circuit 402 stops delivering a negative voltage to the enabled base of the transistor 406a, causing that transistor to conduct and the transistor 6b to cease conducting, whereby the wheel rotation detection circuit 406 detects that the wheel has stopped rotating and delivers a signal voltage at the output terminal 406c thereof. At this time, the signal voltage of the wheel angular deceleration detection circuit 404 vanishes due to the stoppage of rotation of the wheel, but the energizing coil 407a remains energized by the signal voltage developed at the output terminal 406c of the wheel rotation detection circuit 406 and it remains energized until the wheel starts rotating again. Thus, the movable contact 407b and the stationary contact 407c remain engaged with each other whereby the braking force releasing valve 409 continues to release the braking force. Also at this time, the brake pedal is being depressed by the driver thereby closing the brake switch 460 and the signal voltage is present at the output terminal 406c as described above. This turns the AND circuit 461 conductive to thereby energize the energizing coil 410a. The movable contact 410b and the stationary contact 410c are thereby engaged with each other so that the clutch releasing solenoid 412 is energized to disengage the clutch. The engagement of the movable contact 410b with the stationary contact 410c also causes the self-holding circuit 463 to maintain the energization of the energizing coil 410a. Thus, even if the AND circuit 461 should be cutoff, the clutch releasing solenoid 412 remains energized. In this way, simultaneously with the stoppage of the rotation of the wheel the continuous releasing of the braking force on the wheel as well as the releasing of the clutch are effected, and this facilitates the re-starting of the rotation of the wheel. When the anti-skid control operations are completed, by temporarily turning the switch element 411 off, the driver may stop energizing the clutch releasing solenoid 412 to engage the clutch again.

The switch elements 111 in FIG. 3, 310 in FIG. 7, 318 in FIG. 8 and 411 in FIG. 9 may also be constructed to be of a clutch pedal operated type similarly to 211 in FIG. 6, if desired.

What is claimed is:

1. An anti-skid control arrangement for vehicles having a wheel braking system and a cooperating braking force releasing means and a motor-wheel clutch comprising;
    clutch releasing means,
    means for automatically energizing said braking force releasing means upon sensing wheel angular deceleration exceeding a predetermined value to effect automatic releasing of said braking force at least until said deceleration decreases to said predetermined value,
    means operative at least upon the condition that said energizing means is operative, for automatically actuating said clutch releasing means to effect automatic releasing of said clutch, and
    means operable by said energizing means and upon sensing substantially zero wheel speed for maintaining said energizing means operative as aforesaid and for at least conditionally operating said actuating means to cause said clutch to be released by said clutch releasing means as aforesaid.

2. An arrangement as in claim 1 in combination with said motorized wheeled vehicle having said wheel braking system.

3. An arrangement as in claim 1 for vehicles having an operator-operated device for applying said braking force via said braking system, wherein said actuating means includes:
    means responsive to the application of said braking force by said device and to the aforesaid condition that said energizing means is operative for causing said clutch releasing means to release said clutch as aforesaid.

4. An arrangement as in claim 1 for vehicles having an operator-operated device for applying said braking force via said braking system, said arrangement further including:
    means for preventing operation of said actuating means while said device is not caused to apply said braking force.

5. An arrangement as in claim 1 including:
    means for causing said actuating and energizing means to operate substantially simultaneously.

6. An anti-skid control arrangement for vehicles having a wheel braking system and a cooperating braking force releasing means and a motor-wheel clutch comprising:
    clutch releasing means,
    means for automatically energizing said braking force releasing means upon sensing wheel angular deceleration exceeding a predetermined value to effect automatic releasing of said braking force at least until said deceleration decreases to said predetermined value,
    means operative at least upon the condition that said energizing means is operative, for automatically actuating said clutch releasing means to effect automatic releasing of said clutch,
    means operable in response to detecting substantially zero wheel speed for maintaining said energizing means operative to continue releasing said braking force only until said wheel speed increases from zero to a predetermined amount so as to permit reapplication of said braking force,
    said actuating means being initially operative as aforesaid only if substantially zero wheel speed is detected by said maintaining means, and
    means for keeping said clutch releasing means actuated after said wheel speed increases from zero.

7. An anti-skid control arrangement for vehicles having a wheel braking system and a cooperating braking force releasing means and a motor-wheel clutch comprising:
    clutch releasing means,
    means for automatically energizing said braking force releasing means upon sensing wheel angular deceleration exceeding a predetermined value to effect automatic releasing of said braking force at least until said deceleration decreases to said predetermined value, means operative at least upon the condition that said energizing means is operative, for automatically actuating said clutch releasing means to effect automatic releasing if said clutch, means for maintaining said clutch releasing means actuated after wheel deceleration decreases below a predetermined value, and vehicle operator-operated means for releasing said maintaining means and de-actuating said clutch releasing means.

8. An arrangement as in claim 7 wherein said de-actuating means includes a manually operable switch.

9. An arrangement as in claim 7 for vehicles having a clutch pedal operable to declutch said motor and wheels, said de-actuating means being coupled to said clutch pedal to effect de-actuation of said clutch releasing means upon operation of said clutch pedal.

10. An anti-skid control arrangement for vehicles having a wheel braking system and a coperating braking force releasing means and a motor-wheel clutch comprising:

clutch releasing means, means for automatically energizing said braking force releasing means upon sensing wheel angular deceleration exceeding a predetermined value to effect automatic releasing of said braking force at least until said deceleration decreases to said predetermined value, means operative at least upon the condition that said energizing means is operative, for automatically actuating said clutch releasing means to effect automatic releasing of said clutch, and means operable in response to detecting substantially zero wheel rotational speed for maintaining both said energizing and actuating means operative to continue releasing said braking force and clutch while said wheel rotational speed remains zero.

11. An arrangement as in claim 10 including:

means in said maintaining means fo releasing said energizing means after wheel rotational speed increases from zero to a predetermined amount so as to permit reapplication of said braking force, and means for keeping said clutch releasing means actuated after said maintaining means releases said energizing means.

12. An anti-skid control arrangement for vehicles having a wheel braking system and a cooperating braking force releasing means and a motor-wheel clutch comprising:

clutch releasing means, means for automatically energizing said braking force releasing means upon sensing wheel angular deceleration exceeding a predetermined value to effect automatic releasing of said braking force at least until said deceleration decreases to said predetermined value, means operative at least upon the condition that said energizing means is operative, for automatically actuating said clutch releasing means to effect automatic releasing of said clutch, and means for preventing operation of said actuating means if the wheel rotational speed is other than substantially zero.

13. An anti-skid control arrangement for vehicles having a wheel braking system and a cooperating braking force releasing means and a motor-wheel clutch comprising:

clutch releasing means, means for automatically energizing said braking force releasing means upon sensing wheel angular deceleration exceeding a predetermined value to effect automatic releasing of said braking force at least until said deceleration decreases to said predetermined value, means operative at least upon the condition that said energizing means is operative, for automatically actuating said clutch releasing means to effect automatic releasing of said clutch, and means for preventing automatic operation of said actuating means while said vehicle is running.

14. An anti-skid control device for vehicles having braking force releasing means and clutch releasing means, said device comprising:

means for detecting angular deceleration of at least one wheel of said vehicle to provide an output upon deceleration exceeding a predetermined value, switching means in circuit with said detecting means for actuating said braking force releasing means upon receipt of an output from said detecting means, means connected in circuit with said switching means for maintaining the actuation of said braking force releasing means even after the disappearance of said output from said detecting means when the wheels of said vehicle cease to rotate, and means in circuit relationship with said switching means for supplying a clutch release signal to said clutch releasing means when there exists at least the condition that said braking force releasing means is once actuated.

15. An anti-skid control device as in claim 14, wherein said clutch release signal supplying means further include:

a self-holding circuit means for maintaining said clutch release signal after said signal is once supplied to said clutch releasing means, and a switch element connected in circuit with said self-holding circuit means for forcibly breaking said clutch release signal supply.

16. An anti-skid control device as in claim 15 including means for simultaneously operating said clutch release signal supplying means with the actuation of said braking force releasing means.

17. An anti-skid control device as in claim 16, wherein said clutch release signal supplying means further include:

a brake pedal switch, and an AND circuit for performing a logical operation connected in circuit with said brake pedal switch, said AND circuit being arranged to start the supply of said clutch release signal only when said braking force releasing means is actuated and said brake pedal switch is closed.

18. An anti-skid control device as in claim 15, wherein said braking force release maintaining means supplies an output to operate said clutch release signal supplying means.

19. An anti-skid control device as in claim 18, wherein said clutch release signal supplying means further include:

circuit means for detecting engine rotation of said vehicle so that said clutch release signal begins its supply only when the engine ceases to operate and the output from said braking force release maintaining means exists.

20. An anti-skid control device as in claim 19, wherein said engine rotation detection circuit means include:
a first transistor having its base terminal in circuit with the ignition circuit of said engine,
a second transistor having its base terminal in circuit with the collector terminal of said first transistor and having its collector terminal in circuit relationship with said braking force release maintaining means, and
said second transistor being placed into a non-conducting condition by the non-conducting condition of said first transistor when the engine ceases to operate so that said clutch releasing means is operated during the existence of the output from said braking force release maintaining means.

21. An anti-skid control device as in claim 19, wherein said engine rotation detection circuit means include:
an electrical generator for providing an output voltage while the engine is operating,
a first transistor having its base terminal in circuit with the output voltage terminal of said electrical generator,
a second transistor having its base terminal in circuit with the collector terminal of said first transistor and having its collector terminal in circuit relationship with said braking force release maintaining means, and
said second transistor being placed into a non-conducting condition by said first transistor's non-conducting condition when the engine ceases to operate so that said clutch releasing means is placed into operation under existence of the output from said braking force release maintaining means.

22. An anti-skid control device as in claim 15, wherein said self-hodling circuit means include:
a first transistor having its base terminal in circuit with the output terminal of said braking force release maintaining means,
a second transistor having its base terminal in circuit with the collector terminal of said first transistor and having its collector terminal in circuit with the base terminal of said first transistor, and
said second transistor being placed into a conducting condition by the conducting condition of said first transistor as caused by the output of said braking force release maintaining means so that said clutch releasing means is placed into an operating condition and held therein until said switch element is forcibly disconnected.

23. An anti-skid control device as in claim 15, wherein said self-holding circuit means include:
a silicon controlled rectifier having its gate terminal in circuit with the output terminal of said braking force release maintaining means and having its cathode terminal in circuit with said clutch releasing means, said silicon controlled rectifier being placed into a conducting condition by the output from said braking force release maintaining means imparted to its gate terminal so that said clutch releasing means is placed into an operating condition and held therein until said switch element is forcibly disconnected.

24. An anti-skid control device for vehicles having braking force releasing means and clutch releasing means, said device comprising:
means for detecting angular deceleration of the wheels of said vehicle, said means including means for providing an output voltage in proportion to the rotational speed of the wheels of said vehicle,
switching means in circuit with said detecting means for actuating said braking force releasing means upon receipt of an output from said detecting means,
means connected in circuit with said switching means for maintaining the actuation of said braking force releasing means even after the disappearance of said output from said detecting means so long as the wheels of said vehicle are in locked condition, said braking force release maintaining means including a wheel rotation detection circuit coupled in circuit with said output voltage providing means wherein said wheel rotation detection circuit produces an output signal, upon actuation of said braking force releasing means, in accordance with rotation of the wheels, and
means in circuit relationship with said switching means for supplying a clutch release signal to said clutch releasing means, said supplying means being operated simultaneously with the actuation of said braking force releasing means so that said clutch releasing means is placed into operation thereof.

25. An anti-skid control device for vehicles having a braking force releasing means and clutch releasing means, said device comprising:
means for detecting angular deceleration of the wheels of said vehicle, said means including means for providing an output voltage in proportion to the rotational speed of the wheels of said vehicle,
switching means in circuit with said detecting means for actuating said braking force releasing means upon receipt of an output from said detecting means,
means connected in circuit with said switching means for maintaining the actuation of said braking force releasing means even after the disappearance of said output from said detecting means so long as the wheels of said vehicle are in locked condition, said braking force release maintaining means including a wheel rotation detection circuit coupled in circuit with said output voltage providing means wherein said wheel rotation detection circuit produces an output signal, upon actuation of said braking force releasing means, in accordance with rotation of the wheels, and
means in circuit relationship with said switching means for supplying a clutch release signal to said clutch releasing means, said supplying means being operated by an output from said braking force release maintaining means so that said clutch releasing means is placed into operation thereof.

26. An anti-skid control device for vehicles having clutch releasing means comprising:
a wheel angular deceleration detection circuit for detecting an angular deceleration of a wheel,
a switch element adapted to energize a braking force releasing valve with the output from said detection circuit, a wheel rotation detection circuit which is adapted to detect, when the rotation of said wheel stops upon closing of said switch element, the stoppage of rotation of the wheel and to maintain the energization of said braking force releasing valve until the wheel starts rotating again, an AND circuit for performing a logical operation on the signal from said detection circuit and the signal derived through the opening and closing of a brake switch, a switch element for actuating a clutch releasing solenoid with the output from said AND circuit, a self-holding circuit adapted for actuation upon closing of said switch element to maintain the continued energization of said clutch releasing solenoid even after the output of said AND circuit has dissipated, and a switch element to forcibly interrupt the operation of said self-holding circuit.

27. An anti-skid control device for vehicles having braking force releasing means and a clutch releasing solenoid, comprising:

wheel angular deceleration detecting means for detecting the angular deceleration of the wheel, a switch element actuated to a closed state by the output from said detecting means so as to supply a current to said braking force releasing means, wheel rotation detecting means which, when the rotation of the wheel is stopped in the said closed state of said switch element, is operative by detecting the stoppage of rotation of a wheel to maintain the supply of a current to said braking force releasing means until the rotation of the wheel is started again, a second switch element actuated by the output from said wheel rotation detecting means so as to supply a current to a said clutch releasing solenoid, and a third switch element for forcibly stopping the current supplying operation of said second switch element.

28. An anti-skid control device as in claim 27, in which said second switch element includes therein a self-holding circuit which is established by the flow of a current to said clutch releasing solenoid.

29. An anti-skid control device as claimed in claim 27, further comprising:

engine rotation detecting means for detecting whether or not the engine is under rotation, said clutch releasing means being actuated by the output from said wheel rotation detecting means as aforesaid but in conjunction with said engine rotation detecting means so as to release the clutch.

30. An anti-skid control device as claimed in claim 29, in which said engine rotation detecting means includes a generator which is driven in correlation with the rotation of the engine.

31. An anti-skid control device for vehicles comprising:

wheel angular deceleration detecting means for detecting the angular deceleration of the wheel, a first switch element actuated by the output from said detecting means so as to supply a current to braking force releasing means and a clutch releasing solenoid simultaneously, a self-holding circuit disposed in the circuit of said clutch releasing solenoid, and a second switch element opened and closed in interlocked relation with the actuation of the clutch pedal so as to forcibly stop the supply of a current to said clutch releasing solenoid.

32. An anti-skid control device as claimed in claim 31, further comprising wheel rotation detecting means which, when the rotation of the wheel is stopped in the closed state of said first switch element, is operative to maintain the supply of a current to said braking force releasing means until the rotation of the wheel is started again.

* * * * *